(12) United States Patent
Mathew et al.

(10) Patent No.: US 7,596,255 B2
(45) Date of Patent: Sep. 29, 2009

(54) IMAGE NAVIGATION SYSTEM AND METHOD

(75) Inventors: Prakash Parayil Mathew, Mukwonago, WI (US); Yaseen Samara, Palo Alto, CA (US)

(73) Assignee: GE Medical Systems Information Technologies, Inc., Milwaukee, WI (US)

( * ) Notice: Subject to any disclaimer, the term of this patent is extended or adjusted under 35 U.S.C. 154(b) by 741 days.

(21) Appl. No.: 10/723,221

(22) Filed: Nov. 26, 2003

(65) Prior Publication Data

US 2005/0111761 A1    May 26, 2005

(51) Int. Cl.
*G06K 9/00* (2006.01)
*G06F 3/00* (2006.01)

(52) U.S. Cl. .................. 382/130; 382/128; 382/131; 715/974

(58) Field of Classification Search .................. 382/128, 382/130, 131; 715/719, 786, 974
See application file for complete search history.

(56) References Cited

U.S. PATENT DOCUMENTS

| | | | | |
|---|---|---|---|---|
| 5,273,040 | A * | 12/1993 | Apicella et al. | 600/410 |
| 5,825,908 | A * | 10/1998 | Pieper et al. | 382/131 |
| 6,106,470 | A * | 8/2000 | Geiser et al. | 600/443 |
| 6,317,509 | B1 * | 11/2001 | Simanovsky et al. | 382/131 |
| 6,366,296 | B1 * | 4/2002 | Boreczky et al. | 715/719 |
| 6,369,812 | B1 * | 4/2002 | Iyriboz et al. | 345/419 |
| 6,466,687 | B1 * | 10/2002 | Uppaluri et al. | 382/128 |
| 6,813,374 | B1 * | 11/2004 | Karimi et al. | 382/131 |
| 6,823,207 | B1 * | 11/2004 | Jensen et al. | 600/427 |
| 6,901,277 | B2 * | 5/2005 | Kaufman et al. | 600/407 |
| 7,071,689 | B2 * | 7/2006 | Golay et al. | 324/309 |
| 2003/0212327 | A1 * | 11/2003 | Wang et al. | 600/437 |

FOREIGN PATENT DOCUMENTS

EP    1057455 A2 *  12/2000

OTHER PUBLICATIONS

Getting started Microsoft windows 98 1998 Microsoft Corporation p. 48.*
Improved image gidance of coronary stent deployment Robert A. Close, Craig K. Abbey and James S. Whiting. Medical imaging 2000: image display and visualization p. 301-304.*

* cited by examiner

*Primary Examiner*—Wesley Tucker
(74) *Attorney, Agent, or Firm*—Fletcher Yoder

(57) ABSTRACT

A navigational tool is provided for selection of images of interest in large series of images. Difference indices are calculated between adjacent images in the series, and the indices are used to generate a navigational tool which can be presented as a graphical representation of differences between the images. A viewer may select specific locations or sets of images for viewing by manipulation of a virtual tool based upon the representation of the difference indices. The technique thus provides a highly efficient and intuitive tool for location of images in a series where particular features of interest or changes may occur, permitting rapid access and viewing of these images.

27 Claims, 6 Drawing Sheets

IMAGE NAVIGATION SYSTEM AND METHOD

BACKGROUND OF THE INVENTION

The present invention relates generally to imaging systems, and more particularly to techniques for identifying images in a series that are particular interest for viewing, storing, processing, and so forth.

Many imaging systems are known and are presently in use that produce images viewable on a computer or similar viewing station. The images typically comprise a matrix of pixels arranged in rows and columns that can be controlled in gray level or color to provide a composite recognizable and useful image. In the medical diagnostic context, for example, image data may be generated by a range of imaging modalities, such as X-ray systems, MRI systems, CT systems, PET systems, and so forth. The resulting digital images can be stored, compressed, transmitted, and eventually reconstructed from the image data. Large numbers of images can be acquired at a single session or over multiple sessions. Selecting and viewing images of particular interest is a challenge, however, when large numbers of images in a series are available.

Again, in the medical diagnostics context, with the advent of multiple slice CT scanners, for example, a number of images are acquired in a single scan session. CT scanners commonly allow for acquisition of 8 and 16 slices through a subject of interest at once. While in the past particular imaging sessions or studies may have contained 1 to 200 images, many more such images can now be acquired. A viewer, such as a radiologist, would generally navigate through such images by visual inspection, using cine or stacked mode displays.

Continuing with the example of CT imaging, such techniques have been extended to provide cast numbers of images that simply cannot be adequately viewed in a traditional manner. For example, these techniques have extended into functional imaging, where a section of the body is scanned repeatedly over time, such as to study the flow of fluids or contrast agents and thereby visualize tissue function. Examples of such imaging techniques include CT profusion imaging. Other examples include X-ray angiography and fluoroscopy. Using high-resolution acquisition hardware, studies with image counts in excess of 2,000 images are becoming routine. Given workload and time pressures on radiologists and other viewers of such images, navigation through large image sets is no longer a trivial problem. Even when such images are presented in low resolution, substantial time can be required for paging or viewing large sets of 2-5,000 images in a cine mode. Similar problems exist in other imaging modalities and contexts, such as images produced over a long period of time in PET diagnostic imaging of radionucleotide uptake.

The problem of viewing or navigating through large series of images may be thought of as either a time or space problem. That is, a large group of images may represent a progression through a spatial, as in status, non-functional imaging techniques. Similarly, progression through a large number of images in a series may be posed for images acquired over a period of time, and generally of the same spatial region. The latter series are particularly problematic in that very large number of images may be present that require very substantial times for viewing in advanced cine modes.

There is a need, therefore, for an improved technique for navigating through and viewing images in a series or sequence. There is a particular need for a technique which allows for rapidly locating images of interest, permitting a viewer to rapidly access such images for viewing and analysis.

BRIEF DESCRIPTION OF THE INVENTION

The present invention provides a novel technique for navigating through large series of images designed to respond to such needs. The technique may be used in a variety of settings, and use in a medical diagnostic context is described herein. However, the invention may be employed in other settings as well, where large numbers of images are acquired and used for analysis purposes. Similarly, the technique is described in the context of computed tomography imaging, although it is susceptible to application with any suitable imaging modality. Thus, the technique may be used with various medical imaging modalities, such as magnetic resonance imaging, ultrasound imaging, PET imaging, and so forth. The technique may also find applicability where the images of the series are acquired by entirely different mechanisms, or even created without conventional image acquisition.

The invention contemplates methods, systems and computer programs designed to implement such techniques.

DETAILED DESCRIPTION OF SPECIFIC EMBODIMENTS

Figure 1:
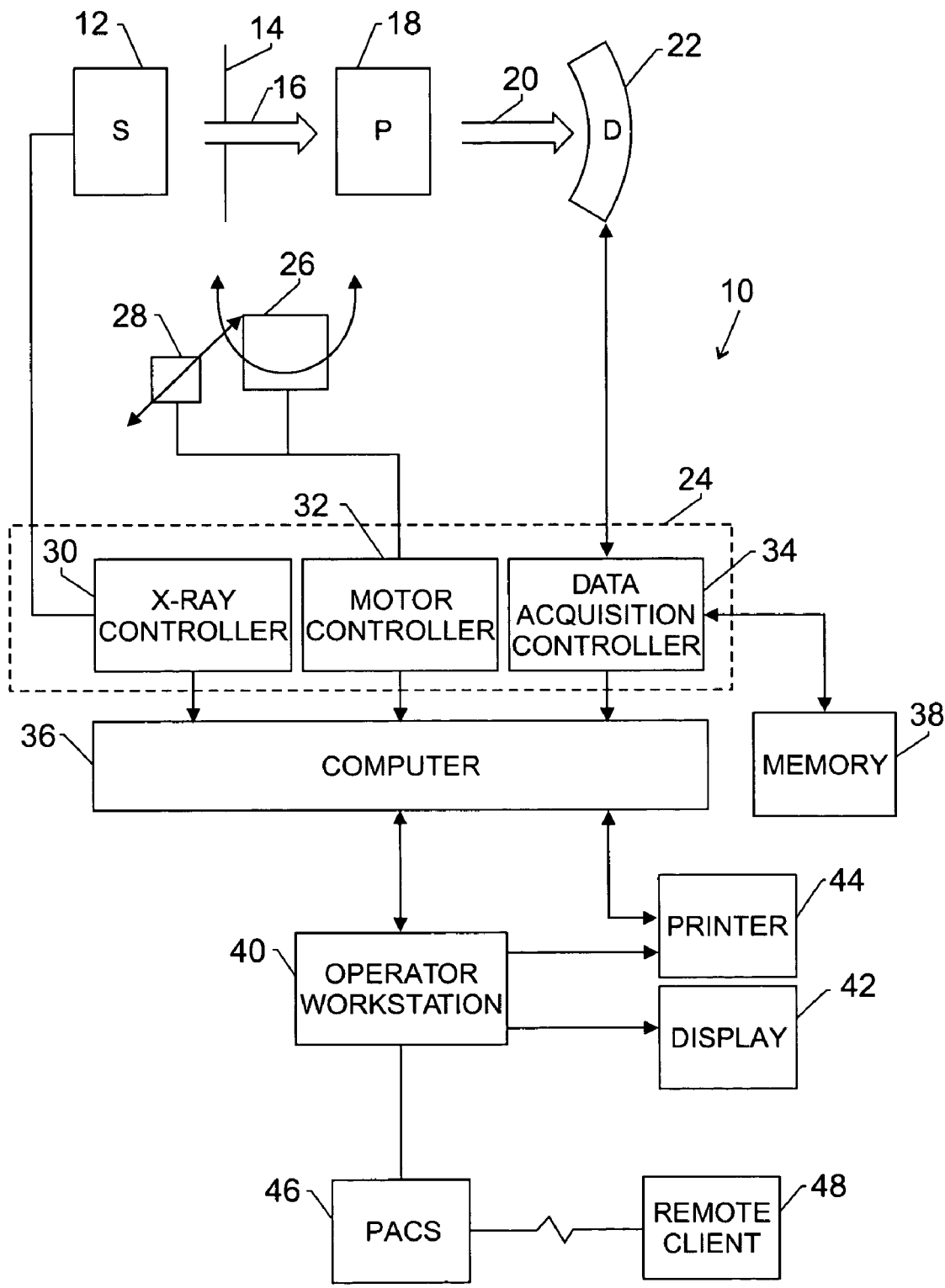
FIG. 1 is a diagrammatical view of an exemplary imaging system, in the form of a CT imaging system, for use in producing a large image series for which navigation is provided in accordance with aspects of the present technique.

FIG. 1 illustrates diagrammatically an imaging system 10 for acquiring and processing large sets of image data for which a navigational and viewing technique is provided, as described in detail below. In the illustrated embodiment, system 10 is a computed tomography (CT) system designed both to acquire original image data, and to process the image data for display and analysis. While the CT system 10 is described herein as one source of a series of images may be generated, it should be borne in mind that other imaging modalities may be employed as well, such as MRI systems, X-ray systems, ultrasound systems, PET systems, and so forth. The techniques described herein may also be utilized with any suitable image series, acquired or generated in any other manner.

In the embodiment illustrated in FIG. 1, imaging system 10 includes a source of X-ray radiation 12 positioned adjacent to a collimator 14. In this exemplary embodiment, the source of X-ray radiation source 12 is typically an X-ray tube. Collimator 14 permits a stream of radiation 16 to pass into a region in which a subject, such as a human patient 18 is positioned. A portion of the radiation 20 passes through or around the subject and impacts a detector array, represented generally at reference numeral 22. Detector elements of the array produce electrical signals that represent the intensity of the incident X-ray beam. These signals are acquired and processed to reconstruct an image of the features within the subject.

Source 12 is controlled by a system controller 24, which furnishes both power and control signals for CT examination sequences. Moreover, detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 24 is coupled to a linear positioning subsystem 26 and rotational subsystem 28. The rotational subsystem 28 enables the X-ray source 12, collimator 14 and the detector 22 to be rotated one or multiple turns around the patient 18. It should be noted that the rotational subsystem 28 might include a gantry. Thus, the system controller 24 may be utilized to operate the gantry. The linear positioning subsystem 26 enables the patient 18, or more specifically a patient table, to be displaced linearly. Thus, the patient table may be linearly moved within the gantry to generate images of particular areas of the patient 18.

Additionally, as will be appreciated by those skilled in the art, the source of radiation may be controlled by an X-ray controller 30 disposed within the system controller 24. Particularly, the X-ray controller 30 is configured to provide power and timing signals to the X-ray source 12. A motor controller 32 may be utilized to control the movement of the rotational subsystem 28 and the linear positioning subsystem 26.

Further, the system controller 24 is also illustrated comprising a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a computer 36.

The computer 36 is typically coupled to the system controller 24. The data collected by the data acquisition system 34 may be transmitted to the computer 36 and moreover, to a memory 38. It should be understood that any type of memory to store a large amount of data might be utilized by such an exemplary system 10. Moreover, the memory 38 may be located at this acquisition system or may include remote components for storing data, processing parameters, and routines described below. Also the computer 36 is configured to receive commands and scanning parameters from an operator via an operator workstation 40 typically equipped with a keyboard and other input devices. An operator may control the system 10 via the input devices. Thus, the operator may observe the reconstructed image and other data relevant to the system from computer 36, initiate imaging, and so forth.

A display 42 coupled to the operator workstation 40 may be utilized to observe the reconstructed image and to control imaging. Additionally, the scanned image may also be printed by a printer 44 which may be coupled to the operator workstation 40. The display 42 and printer 44 may also be connected to the computer 36, either directly or via the operator workstation 40. Further, the operator workstation 40 may also be coupled to a picture archive and communications system (PACS) 46. It should be noted that PACS 46 might be coupled to a remote system 48, radiology department information system (RIS), hospital information system (HIS) or to an internal or external network, so that others at different locations may gain access to the image and to the image data. Additional components and functions of the PACS are set forth below.

It should be further noted that the computer 36 and operator workstation 40 may be coupled to other output devices, which may include standard, or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
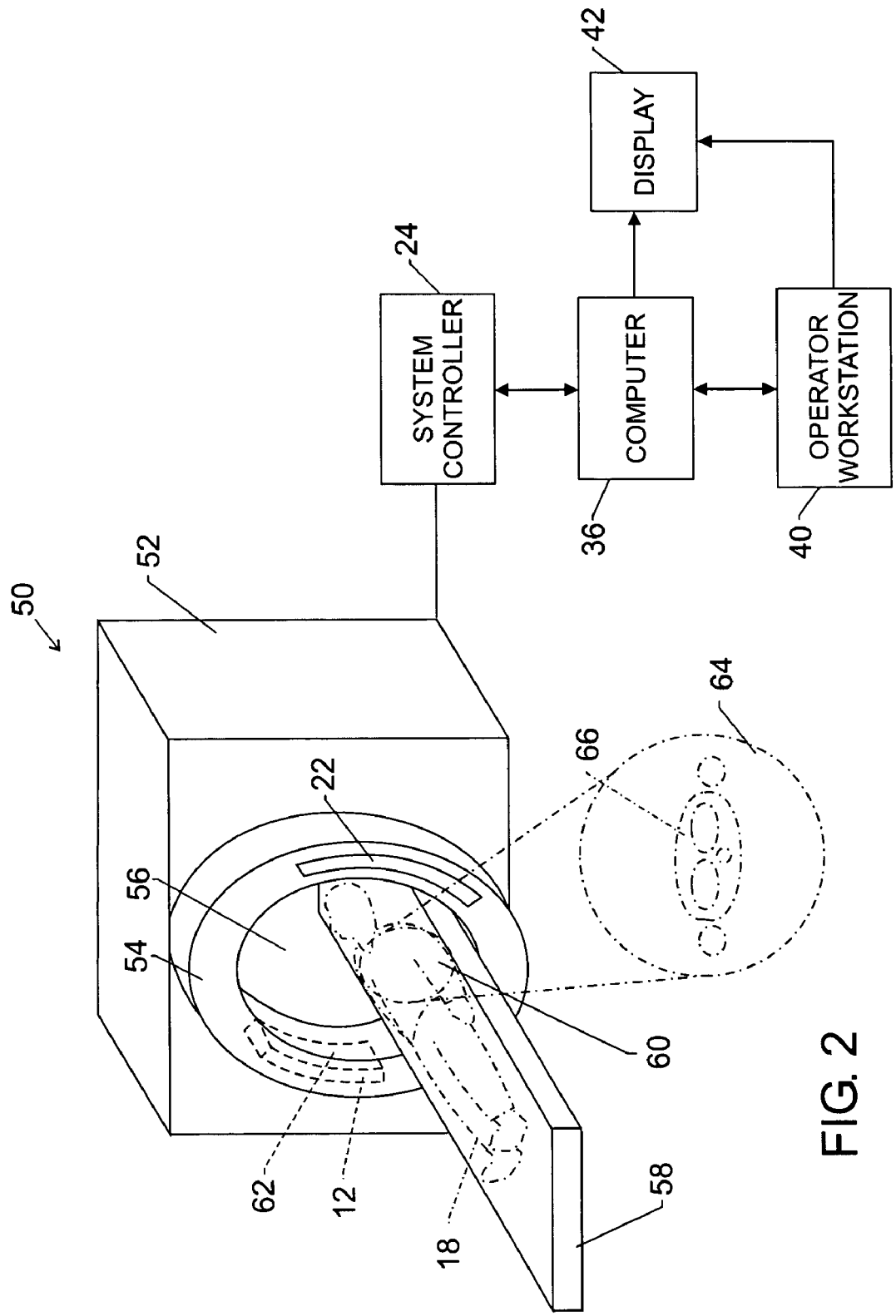
FIG. 2 is another diagrammatical view of a physical implementation of the CT system of FIG. 1.

Referring generally to FIG. 2, the exemplary imaging system of FIG. 1 is illustrated in a form typically used to generate medical images. The CT scanning system 50 is typically a multi-slice detector CT (MDCT) system that offers a wide array of axial coverage, high gantry rotational speed, and high spatial resolution, all of which allow the use of sophisticated image reconstruction algorithms. The CT scanning system 50 is illustrated as including a frame 52 and a gantry 54 with an aperture 56. The aperture 56 may typically be 50 cm in diameter. Further, a patient table 58 is illustrated positioned in the aperture 56 of the frame 52 and the gantry 54. The patient table 58 is adapted so that a patient 18 may recline comfortably during the examination process. Additionally, the patient table 58 is configured to be displaced linearly by the linear positioning subsystem 26 (see FIG. 1). The gantry 54 is illustrated with the source of radiation 12, typically an X-ray tube that emits X-ray radiation from a focal point 62.

In typical operation, X-ray source 12 projects an X-ray beam from the focal point 62 and toward detector array 22. The detector 22 is generally formed by a plurality of detector elements, which sense the X-rays that pass through and around the subject. Each detector element produces an electrical signal that represents the intensity of the X-ray beam at the position of the element at the time the beam strikes the detector. Furthermore, the gantry 54 is rotated around the subject of interest so that a plurality of radiographic views may be collected by the computer 36. Thus, an image or slice is computed which may incorporate, in certain modes, less or more than 360 degrees of projection data, to formulate an image. The image is collimated to desired dimensions, typically less than 40 mm thick using either lead shutters in front of the X-ray source 12 and different detector apertures. The collimator 14 (see FIG. 1) typically defines the size and shape of the X-ray beam that emerges from the X-ray source 12.

Thus, as the X-ray source 12 and the detector 22 rotate, the detector 22 collects data of the attenuated X-ray beams. Data collected from the detector 22 then undergoes pre-processing and calibration to condition the data to represent the line integrals of the attenuation coefficients of the scanned objects. The processed data, commonly called projections, are then filtered and backprojected to formulate an image of the scanned area. As mentioned above, the computer 36 is typically used to control the entire CT system 10 (see FIG. 1). The main computer that controls the operation of the system may be adapted to control features enabled by the system controller 24. Further, the operator workstation 40 is coupled to the computer 36 as well as to a display, so that the reconstructed image may be viewed. Alternatively, some or all of the processing described herein may be performed remotely by additional computing resources based upon raw or partially processed image data.

The system 10 (see FIG. 1) thus generates multiple images from acquired image data. Each reconstructed image corresponds to a slice 60 which, when cast in pixilated format, becomes a separate image related to other images sequentially in the imaged volume. For each image 60, then, within an image area or field of view 64, certain features of interest 66 will be visible.

As will be appreciated by those skilled in the art, the CT system acquires data continuously, although at discrete image view frames corresponding to specific angular positions, as the source and detector rotate about the subject. Moreover, in helical modes of operation, the data are collected as the subject is displaced by movement of the table. The resulting data set contains a large quantity of data points representative of the intensity of radiation impacting elements of the detector at each of the angular positions. Reconstruction of images proceeds by selecting desired "reconstruction windows" or spans of data points which, based upon the reconstruction algorithm employed, provide sufficient information to calculate locations of features causing X-ray attenuation. Such reconstruction techniques may employ windows spanning all 360° of angular positions, but for reasons of computational efficiency and to reduce the incidence of motion-induced artifacts, reconstruction algorithms generally rely upon windows spanning 180° plus the included angle of the X-ray beam (typically referred to as the fan angle or "$\alpha$"). Due to redundancy in the data, such reconstruction windows generally suffice for image reconstruction and provide improved temporal resolution. Other techniques may employ a combination of data acquired during a plurality of shorter windows, such as in techniques referred to as multi-sector reconstruction.

Following image data acquisition, processing in reconstruction, a large number of images will typically be created that can be reviewed by radiologists and other clinicians to identify possible features of interest. In a medical context, these features of interest may include anatomical regions, tissues, organs, anomalies that could be indicative to disease states, and so forth. In certain modes of operation, the imaging system 10 (See FIG. 1) may produce hundreds or thousands of images. The present technique provides a mechanism for assisting in navigating through such large image sets and for identifying specific regions or features of interest in the image sets such that specific images or sets of images can be reviewed. The technique makes use of a navigational technique which may be referred to as a scout navigation tool. It should be understood, however, in the present context the term "scout" is not to be confused with conventional scout images generated prior to CT data acquisition. In the present context, the scout navigation tool is generated from the acquired image data and may be stored along with the original images, such as in a secondary capture operation. The scout navigation tool is then viewed by the radiologist or clinician to identify which particular images may include the particular features of interest.

Figure 3:
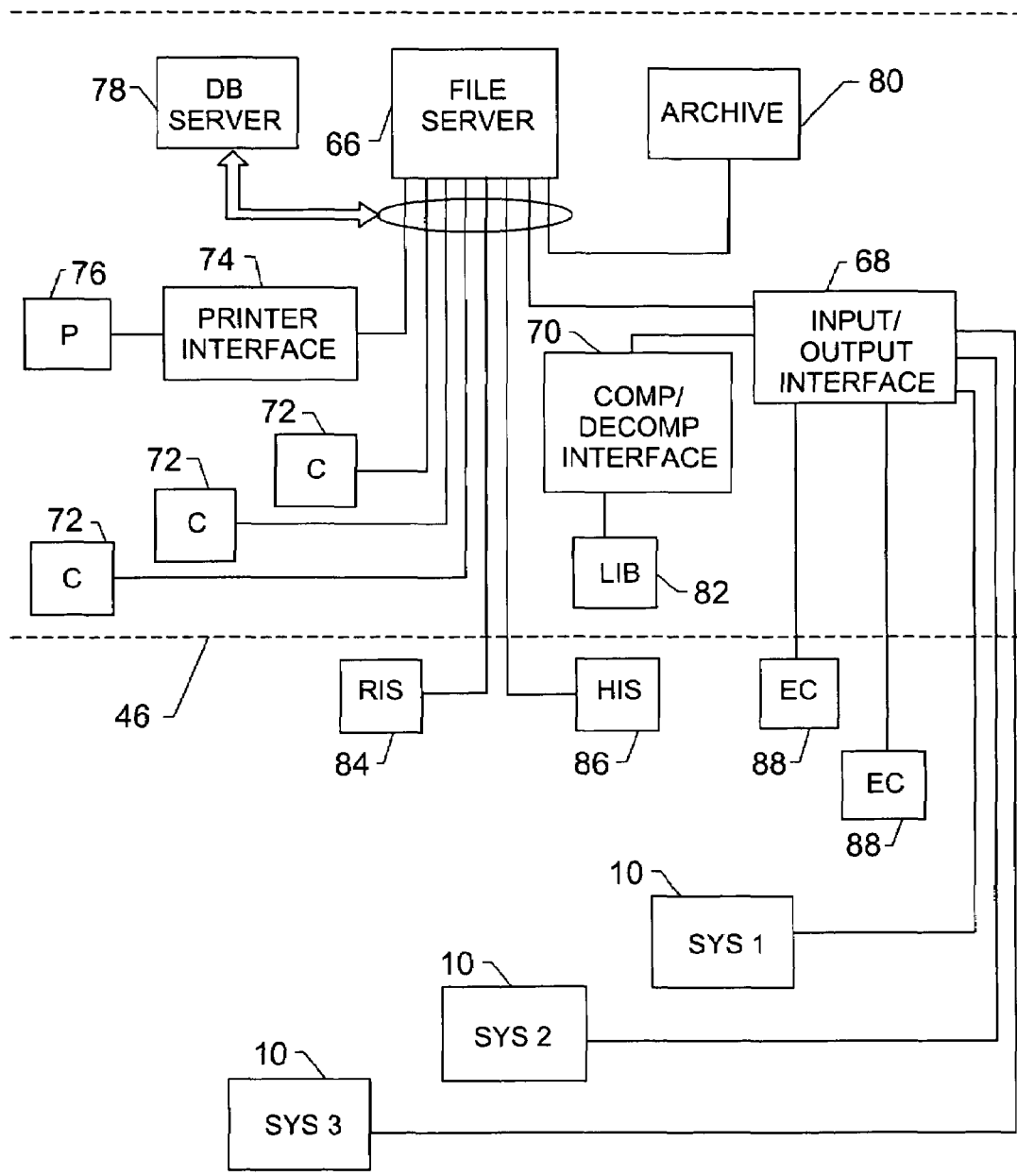
FIG. 3 is a diagrammatical representation of an exemplary image management system, in the illustrated example a picture archive and communications system or PACS, for receiving and storing image data in accordance with certain aspects of the present technique, and for serving he images for navigation and viewing.

As noted above, the images generated by the system are typically stored in a PACS 46 (refer to FIG. 1). FIG. 3 illustrates an exemplary PACS 46 for receiving, storing and providing access to image data. In the illustrated embodiment, PACS 46 receives image data from several separate imaging systems, including system 10. PACS 46 includes one or more file servers 66 designed to receive and process image data, and to make the image data available for review. Server 66 receives the image data through an input/output interface 68. Image data may be compressed in routines accessed through a compression/decompression interface 70. In a typical system, interface 70 serves to compress the incoming image data rapidly and optimally, while maintaining descriptive image data available for reference by server 66 and other components of the PACS. Where desired, interface 70 may also serve to decompress image data accessed through the server. Compression of the data at the interface 70 may allow more data to be stored on the system 46 or may allow data to be transmitted more rapidly and efficiently to sites on the network which may also be configured to decompress the compressed data.

The server is also coupled to internal clients, as indicated at reference numeral 72, each client typically including a work station at which a radiologist, physician, or clinician may access image data from the server, decompress the image data, and view or output the image data as desired. Clients 72 may also input information, such as dictation of a radiologist following review of examination sequences. Similarly, server 66 may be coupled to one or more interfaces, such as a printer interface 74 designed to access and decompress image data, and to output hard copy images via a printer 76 or other peripheral.

A database server 78 may associate image data, and other work flow information within the PACS by reference to one or more file servers 66. In a presently contemplated embodiment, database server 78 may include cross-referenced information regarding specific image sequences, referring or diagnosing physician information, patient information, background information, work list cross-references, and so forth. The information within database server 78 serves to facilitate storage and association of the image data files with one another, and to allow requesting clients to rapidly and accurately access image data files stored within the system. Similarly, server 66 is coupled to one or more archives 80, such as an optical storage system, which serve as repositories of large volumes of image data for backup and archiving purposes. Techniques for transferring image data between server 66, and any memory associated with server 66 forming a short term storage system, and archive 80, may follow any suitable data management scheme, such as to archive image data following review and dictation by a radiologist, or after a sufficient time has lapsed since the receipt or review of the image files.

In the illustrated embodiment, other components of the PACS system or institution may be integrated with the foregoing components to further enhance the system functionality. For example, as illustrated in FIG. 3, a compression/decompression library 82 is coupled to interface 70 and serves to store compression routines, algorithms, look up tables, and so forth, for access by interface 70 (or other system components) upon execution of compression and decompression routines (i.e. to store various routines, software versions, code tables, and so forth). In practice, interface 70 may be part of library 82. Library 82 may also be coupled to other components of the system, such as client stations 72 or printer interface 74, which may also be configured to compress or decompress data, serving similarly as a library or store for the compression and decompression routines and algorithms. Although illustrated as a separate component in FIG. 3, it should be understood that library 82 may be included in any suitable server or memory device, including within server 66. Moreover, code defining the compression and decompression processes described below may be loaded directly into interface 70 and/or library 82, or may be loaded or updated via network links, including wide area networks, open networks, and so forth.

Additional systems may be linked to the PACS, such as directly to server 78, or through interfaces such as interface 68. In the embodiment illustrated in FIG. 3, a radiology department information system or RIS 84 is linked to server 66 to facilitate exchanges of data, typically cross-referencing data within database server 78, and a central or departmental information system or database. Similarly, a hospital information system or HIS 86 may be coupled to server 78 to similarly exchange database information, workflow information, and so forth. Where desired, such systems may be interfaced through data exchange software, or may be partially or fully integrated with the PACS system to provide access to data between the PACS database and radiology department or hospital databases, or to provide a single cross-referencing database. Similarly, external clients, as designated at reference numeral 88, may be interfaced with the PACS to enable images to be viewed at remote locations. Such external clients may employ decompression software, or may receive image files already decompressed by interface 70. Again, links to such external clients may be made through any suitable connection, such as wide area networks, virtual private networks, and so forth.

As mentioned above, the CT imaging system and the medical support systems described above should be considered as exemplary only. That is, many other imaging systems, including CT systems of different configuration, and different modality systems may be employed for generating basic image data for which the scout navigation tool is employed. Similarly, the present technique may be used in a wide variety of contexts, is not limited to medical applications. Such contexts may include, but are not limited to, various inspection applications, including package and parcel inspection, part inspection, and so forth. Applications may also include those in which photographic or other images are generated and compiled into large series, and also applications in which images are created by computer programs and other devices rather than conventional image acquisition systems.

Figure 4:
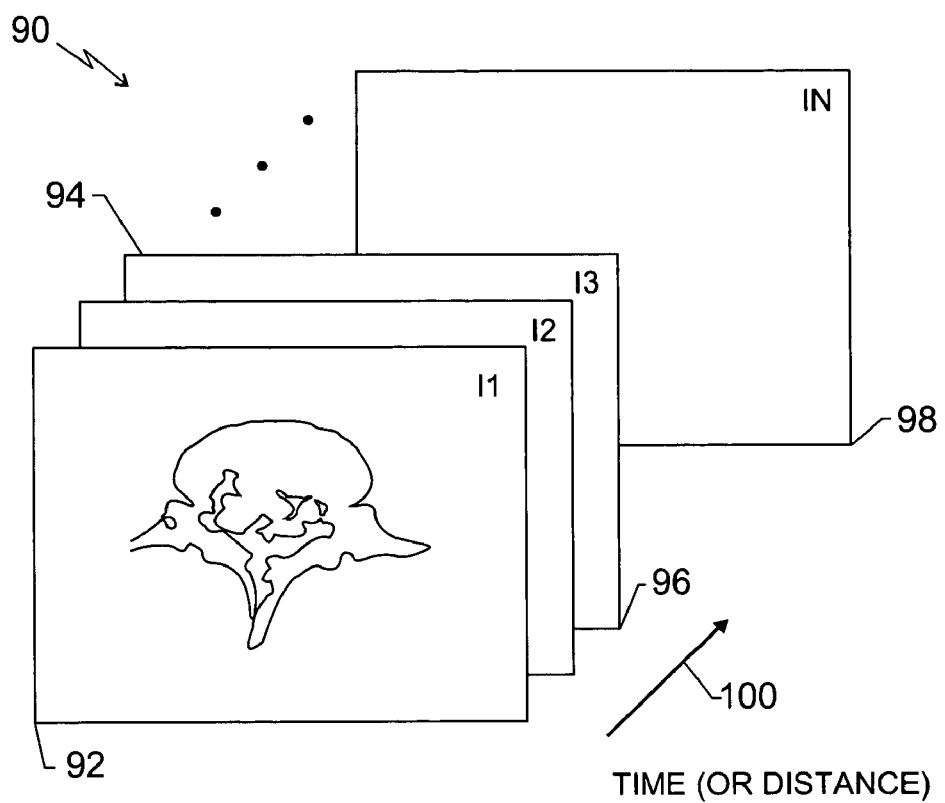
FIG. 4 is a diagrammatical representation of a series of images of the type that may be generated by the system of FIG. 1 and stored in the system of FIG. 3 for which navigation is provided by the present technique.

To permit efficient location and viewing of particular features of interest in images in a series, the present technique makes use of a navigation scout tool as described below. The problem with navigating through such large series of images is illustrated generally in FIG. 4. FIG. 4 illustrates a series 90 of images that includes first, second and third images 92, 94, and 96, and continuing through some maximum image designation 98. This number of images may be quite considerable, including many hundreds or thousands of images. Each image or frame is essentially a picture of some feature of interest, such as a portion of the body in a medical diagnostic context. Successive images or frames may represent motion, or more generally change in the orientation or depiction of the subject matter from adjacent frames. Where no change from adjacent frames takes place, the incremental information contained in successive frames is minimal or non-existent.

In the present context, it is assumed that for navigational purposes, a viewer is often particularly interested in locations in the series of images where some sort of change or evolution occurs. Such change may be considered as some identifiable differential between adjacent images or frames in the series.

Figure 5:
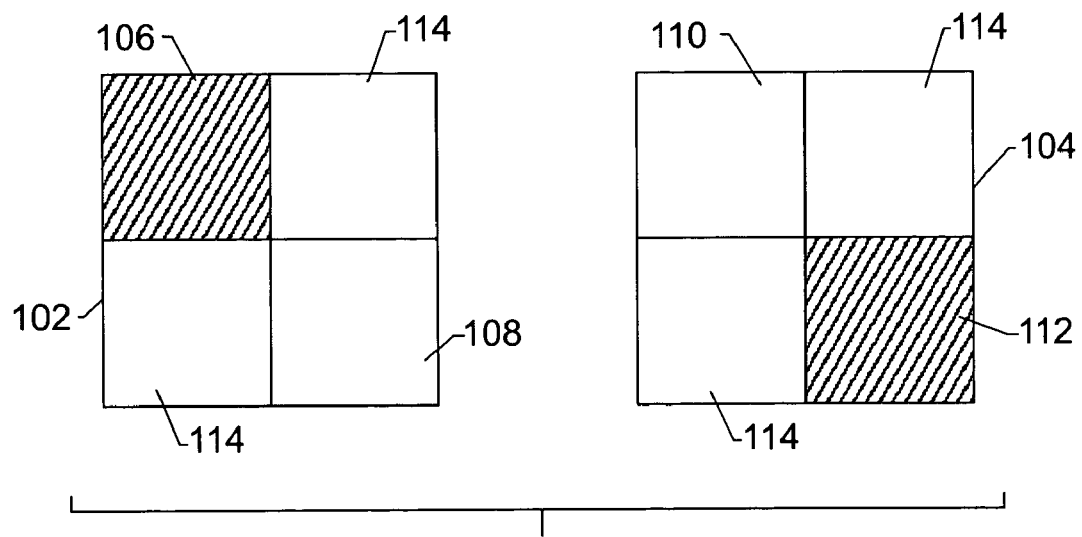
FIG. 5 is an exemplary illustration of portions of a pair of images at different points in time exemplifying a manner in which changes in the images over time may be analyzed in accordance with the present technique.

As represented generally in FIG. 5, for purposes of explanation, a portion 102 of a first image in a series may be compared to a similar portion 104 if a second image. Certain pixel regions in the pixilated image may be of particular interest, such as a pixel illustrated in the upper left of each image and designated by reference numeral 106 in image portion 102. Other pixels of interest may include pixel 108 of the same image portion, due to the fact that these pixels change intensity, contrast or some other viewable or significant characteristic from image portion 102 to image portion 104. That is, in the illustrated example, pixel 106 is dark in image portion 102 and becomes light in image portion 104, as represented at reference numeral 110. By contrast, pixel 108 in image portion 102 transitions from relatively light in image portion 102 to dark in image portion 104 as indicated by reference numeral 112. Other pixels in the image may undergo no significant change, as indicated at reference numeral 114 in both image portions. Such change is considered to be significant in that it can inform a viewer of some meaningful evolution in the images of the sequence.

It should be borne in mind that the images of the series may be juxtaposed so as to represent changes or evolution over time, as indicated in the diagrammatical representation of FIG. 4 by arrow 100 or over distance or space. The present technique provides for identification of differences or changes between adjacent images in such series so as to provide an intuitive and efficient tool for navigating to and through regions in the series in which meaningful changes are exhibited.

In accordance with the present technique, an index or evaluation of changes occurring between adjacent images in a series is developed. In accordance with a present embodiment, differential quantities are computed between adjacent images of a series by computing differences between similarly positioned pixels, and accumulating the differences. By way of example, on a pixel-by-pixel basis, the absolute value of the difference between each pixel of a second image of a series and a first image of a series is calculated. A similar calculation is made for each adjacent image pair, and resulting difference indices are accumulated for each image pair in the series. As will be appreciated by those skilled in the art, in gray-scale images, possible values for each pixel may vary depending upon the dynamic range of the image. Thus, various gray levels may be represented numerically by values of from $0-2^8$, $0-2^{12}$, and so forth. In color images, similar images can be computed for the three base colors of which the color image is comprised.

In the simple example of FIG. 5, for example, if the gray level of pixels 106 and 112 are represented by 1, while a light pixel has a value of 0, for the four pixel image portion, the accumulated index representing the change or difference in the images has a value of 2. That is, the change of pixel 106 from dark to light and the change of pixel 108 from light to dark each contribute a value of 1 (the absolute value of the difference), while the remaining pixels contribute nothing to the index given that they do not change in value. Other measures or formulas may be employed for identifying such difference indices. By way of example, any suitable mathematical difference quantity may be employed, such as Fourier, spectral differences, wavelet, coefficient differences, and so forth may be employed. Other techniques may include inter-frame subtraction algorithms, and so forth, depending upon the nature of the images, the nature of the physics on which the images are based, and so forth.

In addition to computation of the difference index, noise between the images may be taken into account during the process. For example, in two successive images or frames of background only images (with no subject of interest), a difference method may compute a non-zero index due to the presence of noise. Where "shot" noise or "digitization" noise or other noise factors are present in the imaging chain, non-meaningful differences between adjacent images in the series may occur. When imaging a subject of interest, such as anatomy, with large background regions, in certain context the index may be dominated by the background subtraction noise, even where the actual subject of interest has not significantly changed. Accordingly, such noise may be taken into account by imposing a "noise gate" either before or after calculation of the difference value or index. Many such techniques will be available to those skilled in the art, and the appropriate technique may depend upon the system used to generate the images, and the physics of the system. By way of example, when computing the absolute difference between pixels of successive frames or images, a constant quantity may be subtracted that is related to the noise in the pixels as dictated by the imaging physics. The choice of the quantity and its relation to the pixel noise may be a constant or a function of the signal. Accordingly, the noise gate may be imposed for every pixel pair difference (differences between similarly located pixels for adjacent images). Such techniques will aide in filtering the noise and avoiding the domination of the index by the background.

Figure 6:
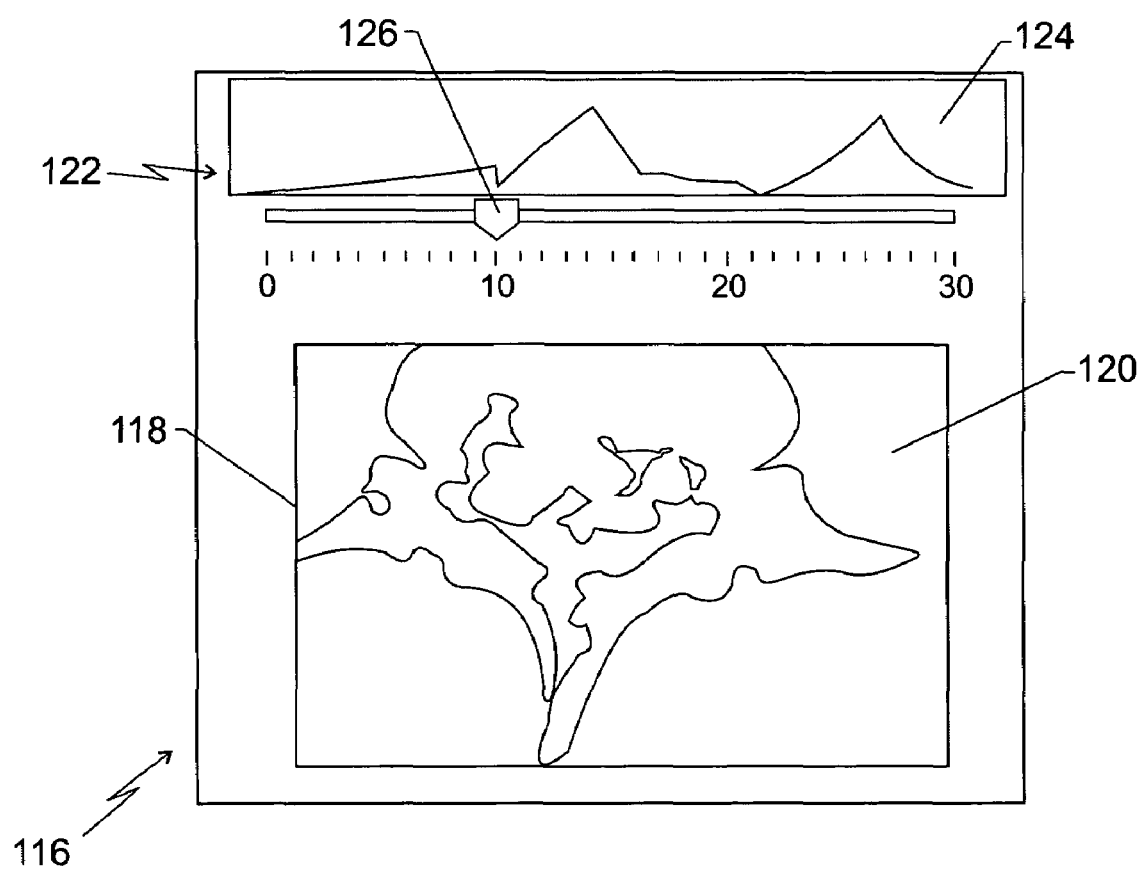
FIG. 6 is an illustration of an exemplary presentation of an image with a scout navigation tool in accordance with the present technique for identifying particular reasons of interest and for efficiently downloading, presenting, storing, or otherwise processing the images.

Based upon the calculation of the difference value or index, the present technique provides for a generation of a highly efficient and innovative tool for navigating through the large series of images. FIG. 6 illustrates such a tool for navigating through a series of images of the type shown in FIG. 4. In the exemplary embodiment of FIG. 6, a screen 116 is illustrated in which a viewport 118 is provided. The screen 116 may be part of a conventional workstation or viewing station of the type described above. An image display 120 is provided in the viewport 118 in which the viewer may see images from the series as selected by a navigation tool.

A scout navigation tool 122 is shown in the screen 116 for navigating through the series of images. In the exemplary embodiment of FIG. 6, the scout navigation tool comprises a graphical representation 124 of the difference indices, and a virtual navigation tool 126 for selecting desired images from the series. In the illustrated example, the indices are compiled to form a graphical trace, although many other graphical representations or other representations may be envisaged. By way of example, the indices may represent a continuous trace, a histogram, a surface, changing colors or symbols, and so forth. The virtual navigation tool 126 may also have various forms. In the illustrated embodiment, the virtual navigation tool 126 is a pointer or slide which may be moved horizontally along a line corresponding to particular images within the series. Where differences or changes are particularly noteworthy, such as for the two large rising and falling peeks in the graphical representation of FIG. 6, the user may manipulate the virtual navigation tool 126, such as via a conventional computer mouse, to focus attention particularly on such regions. As the viewer then selects such regions, images corresponding to these regions are served and displayed for viewing.

Figure 7:
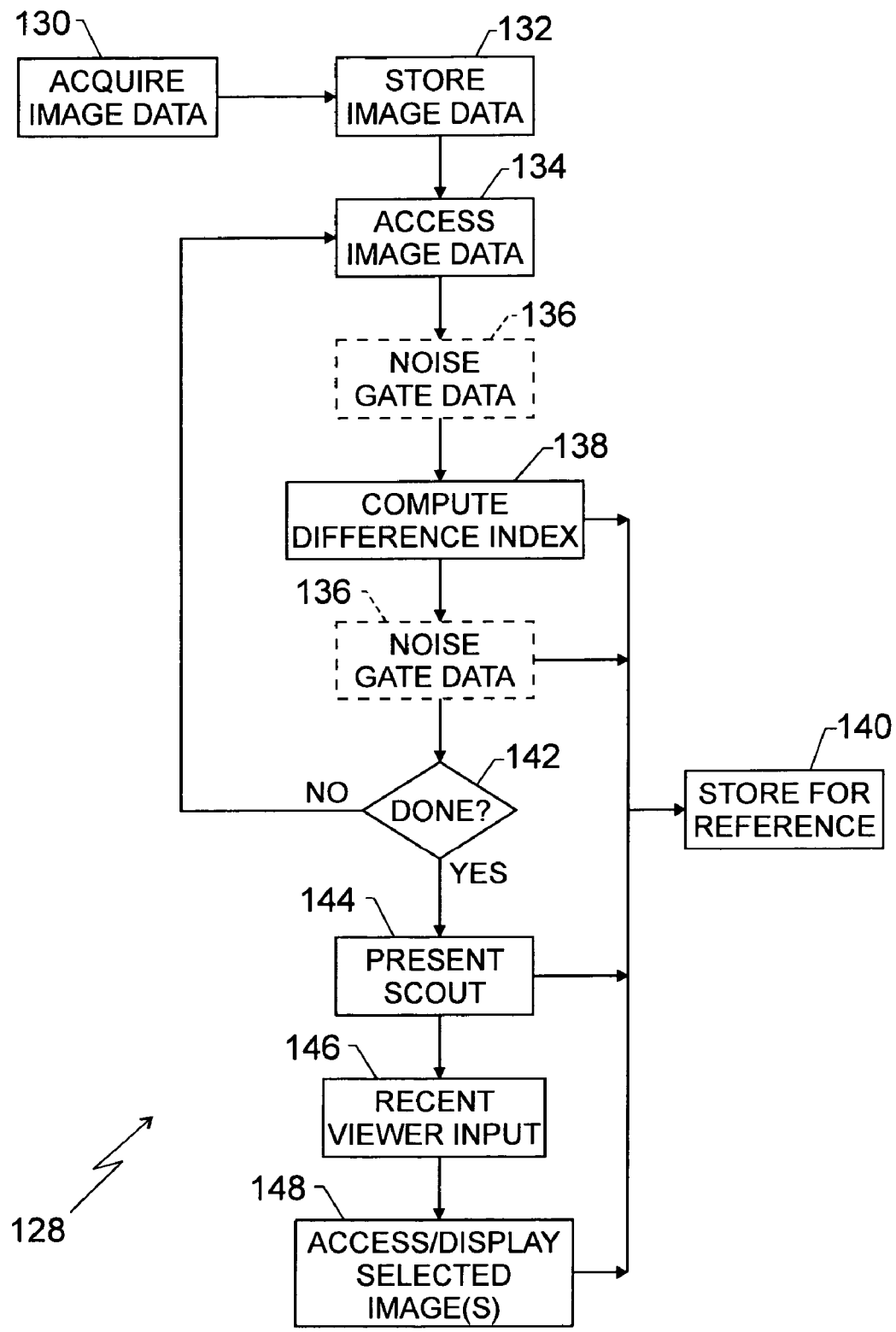
FIG. 7 is a flowchart illustrating exemplary logic for generating and utilizing a scout tool of the type illustrated in FIG. 6.

FIG. 7 summarizes the overall process for generating and displaying the navigational tool through exemplary logical steps designated generally by reference numeral 128. Initial steps would include some type of acquisition of image data as indicated at reference numeral 130, followed by storage of the image data at step 132. As will be appreciated by those skilled in the art, various processing, manipulation, refinement, scaling, adjustment, and so forth may be provided during these various steps. At step 134, the image data is accessed. As noted above, the image data may be accessed by any suitable mechanism, such as through a server that provides the image data to a viewing station. The access of the image data may include decompression, transmission, image reconstruction, and so forth. At step 136 the data is noise gated as described above, where desired. At step 138 the difference index is computed, also as described above. The index may, again, be based upon accumulated differences between adjacent images on a pixel-by-pixel basis, or by any other suitable means. Where desired, the computed difference index may be stored for later reference, including with the image series itself, as indicated at reference numeral 140. The step of noise gating is again indicated following the computation of the difference index due to the fact that, as noted above, such noise gating may be provided before or after the computation. At step 142 the logic determines whether all images in the series have been processed to determine difference indices, and if not, the next image in the series is accessed at step 134. In this manner, difference indices are computed between all adjacent images in the series by accessing and computing the indices for two adjacent images at each step through the sequence.

Once all images in the series have had difference indices calculated with each adjacent image, the scout navigation tool described with reference to FIG. 6 is generated and presented as indicate at step 144. This tool itself may also be stored for reference, such as with the image series itself, as indicated at step 140. Based upon input from the viewer, received at step 146, then, images of the series may be accessed and displayed on a selective basis as indicated at step 148.

It should be noted that, while the present technique greatly facilitates accessing and viewing of selected images based upon the navigation scout tool, the tool may also be used for selective serving, processing, compression, decompression, or any other manipulation of the desired images. That is, where bandwidth or storage capacity is limited, for example, only selected images may be accessed and transmitted, decompressed, stored, or otherwise processed based upon input from the viewer and manipulation of the provided tool.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for processing image data comprising:
   comparing with a processor image data representative of a plurality of medical images, wherein the plurality of medical images represent spatially adjacent subject matter;
   calculating with a processor a level of change of the image data from one image to the next in the plurality of medical images; and presenting a viewer with the calculated levels of change of the image data for the plurality of medical images.

2. The method of claim 1, wherein calculating the level of change comprises analyzing absolute differences between adjacent images in the plurality of images.

3. The method of claim 2, wherein the absolute differences are analyzed on a pixel-by-pixel basis.

4. The method of claim 1, wherein calculating the level of change of the image data includes calculating change due to noise in the image data, and not including changes due to noise in the presented calculated levels of change.

5. The method of claim 1, wherein the presented calculated levels of change comprises a graphical representation of progressive change between images of the plurality of images.

6. The method of claim 5, comprising presenting the viewer with a virtual tool for navigating though the plurality of images based upon the progressive change between the images.

7. A method for diagnosing a patient, comprising:
acquiring a plurality of reconstructed images via a medical imaging system;
comparing image data representative of the plurality of reconstructed images; and
generating a scout navigation tool by quantifying a level of change of the image data from one reconstructed image to the next in the plurality of reconstructed images, the scout navigation tool including a graphical representation of progressive change between reconstructed images of the plurality of reconstructed images and a virtual tool for navigating though the plurality of reconstructed images based upon the level of change.

8. The method of claim 7, comprising displaying the scout navigation tool on a viewable screen.

9. The method of claim 8, comprising receiving inputs from a viewer via the scout navigation tool and displaying reconstructed images from the plurality of reconstructed images based upon the inputs.

10. The method of claim 8, comprising receiving inputs from a viewer via the scout navigation tool and storing reconstructed images from the plurality of reconstructed images based upon the inputs.

11. The method of claim 8, comprising receiving inputs from a viewer via the scout navigation tool and processing reconstructed images from the plurality of reconstructed images based upon the inputs.

12. The method of claim 8, comprising displaying the scout navigation tool adjacent to an image viewing region of the viewable screen.

13. The method of claim 7, wherein the plurality of reconstructed images represent a same subject of interest at different points in time.

14. The method of claim 7, wherein the plurality of reconstructed images represent spatially adjacent subject matter at generally the same point in time.

15. The method of claim 7, wherein the level of change is quantified by determining absolute differences between adjacent reconstructed images in the plurality of reconstructed images.

16. The method of claim 15, wherein the absolute differences are determined on a pixel-by-pixel basis.

17. The method of claim 16, wherein quantifying the level of change of the image data includes quantifying change due to noise in the image data, and not including changes due to noise in the graphical representation.

18. A system for processing image data comprising:
a memory device for storing image data;
processing circuitry configured to compare image data representative of a plurality of images acquired via a medical imaging system and not as video, and to generate a scout navigation tool by computing a level of change of the image data from one image to the next in the plurality of images, the scout navigation tool including a graphical representation of progressive change between images of the plurality of images and a virtual tool for navigating through the plurality of images based upon the level of change.

19. The system of claim 18, comprising a user viewable display for displaying the scout navigation tool and images from the plurality of images based upon use inputs.

20. The system of claim 19, comprising a user input device for selection of images for viewing from the plurality of images via manipulation of the virtual tool.

21. The system of claim 20 wherein the virtual tool includes a slider displayed adjacent to the graphical representation.

22. A system for diagnosing a patient, comprising:
means for comparing image data representative of a plurality of diagnostic images of the patient acquired via a medical imaging system, wherein the plurality of images represent spatially adjacent subject matter,
means for calculating a level of change of the image data from one image to the next in the plurality of images; and
means for presenting a viewer with the calculated levels of change of the image data for the plurality of images.

23. A system for processing image data comprising:
means for comparing image data representative of a plurality of images acquired via a medical diagnostic imaging system; and
means for generating a scout navigation tool by quantifying a level of change of the image data from one image to the next in the plurality of images, the scout navigation tool including a graphical representation of progressive change between images of the plurality of images and a virtual tool for navigating though the plurality of images based upon the level of change, wherein quantifying a level of change of the image data includes quantifying change due to noise in the image data.

24. A computer program provided on a computer readable medium and containing computer executable instructions for processing image data, comprising:
at least one computer readable medium; and
code stored on the at least one computer readable medium encoding routines for comparing image data representative of a plurality of images acquired via a medical imaging system, calculating a level of change of the image data from one image to the next in the plurality of images, and presenting a viewer with the calculated levels of change of the image data for the plurality of images, wherein the plurality of images represent spatially adjacent subject matter.

25. A computer program provided on a computer readable medium and containing computer executable instructions for diagnosing a patient, comprising:
at least one computer readable medium; and
code stored on the at least one computer readable medium encoding routines for comparing image data representative of a plurality of images acquired via a medical diagnostic imaging system and not as a video, and generating a scout navigation tool by computing a level of change of the image data from one image to the next in the plurality of images, the scout navigation tool including a graphical representation of progressive change between images of the plurality of images and a virtual tool for navigating through the plurality of images based upon the level of change.

26. The method of claim 1, wherein calculating a level of change comprises:
   calculating an absolute value of a difference between corresponding areas in a pair of images; and
   accumulating the absolute values of the differences to determine a difference index for a pair of images.

27. The method of claim 7, wherein quantifying the level of change of the image data from one reconstructed image to the next comprises:
   calculating an absolute value of a difference between corresponding areas in the reconstructed images; and
   summing the calculated absolute values to determine a difference index for a pair of reconstructed images.

* * * * *

UNITED STATES PATENT AND TRADEMARK OFFICE
CERTIFICATE OF CORRECTION

PATENT NO. : 7,596,255 B2
APPLICATION NO. : 10/723221
DATED : September 29, 2009
INVENTOR(S) : Mathew et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this

Twenty-eighth Day of September, 2010

David J. Kappos
*Director of the United States Patent and Trademark Office*